UNITED STATES PATENT OFFICE.

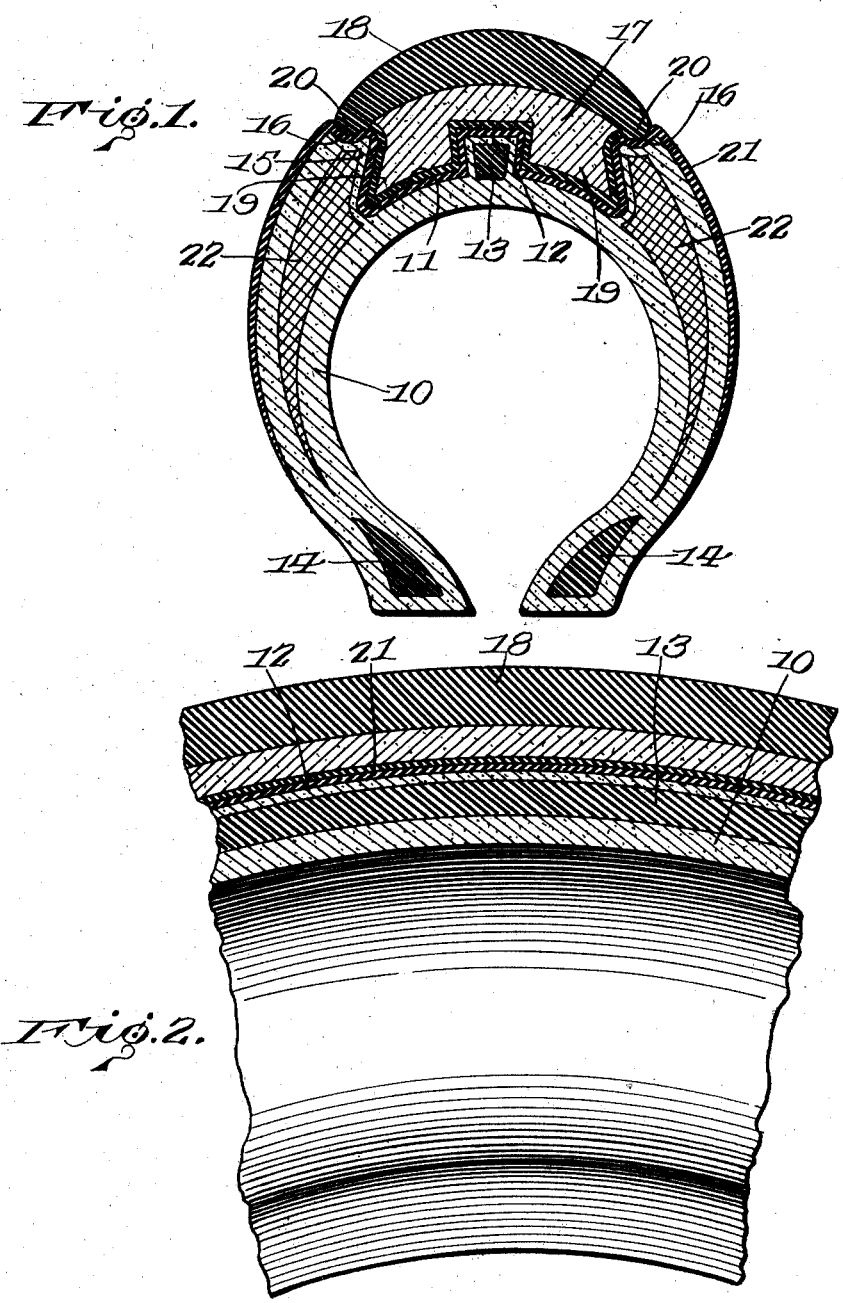

GEORGE MICHAELSEN AND JULIUS J. ROTH, SR., OF NEW YORK, N. Y.

PNEUMATIC TIRE.

1,401,483.        Specification of Letters Patent.    Patented Dec. 27, 1921.

Application filed May 17, 1921. Serial No. 470,296.

*To all whom it may concern:*

Be it known that we, GEORGE MICHAELSEN and JULIUS J. ROTH, Sr., citizens of the United States, residing at New York, in the county of New York, State of New York, have invented certain new and useful Improvements in Pneumatic Tires; and we do hereby declare the following to be a full, clear, and exact description of the invention, such as will enable others skilled in the art to which it appertains to make and use the same.

This invention relates to new and useful improvements in tires and particularly to pneumatic tires.

One object of the invention is to provide a removable tread for a pneumatic tire which is possessed of novel means whereby it is firmly locked in the tire shoe against movement or displacement, while the tire is inflated.

Another object is to provide a pneumatic tire having reinforcing means at the points of lock between the removable tread and the shoe, and also at such points as will practically eliminate the danger of blow-outs.

Other objects and advantages will be apparent from the following description when taken in connection with the accompanying drawing.

In the drawing:

Figure 1 is a vertical transverse sectional view through a pneumatic tire showing the removable tread therein.

Fig. 2 is a vertical longitudinal central sectional view through the shoe and removable tread, on the line 2—2 of Fig. 1.

Referring particularly to the accompanying drawing, 10 represents the shoe of a pneumatic tire which has the circumferentially extending groove or channel 11 around its periphery, and formed in the center of this channel, and projecting radially outward, is a circumferentially extending dove-tail rib 12. Embedded within this rib, and extending the entire length thereof, is a reinforcing ring 13, formed of solid rubber, or of rubber and fabric. In each of the tire engaging flanges 10' of the shoe is embedded a triangular ring similar to the ring 13, as shown at 14.

At opposite sides of the channel 11 are formed the circumferential ribs 15, which incline inwardly over the channel, and in the outer end face of each rib there is formed a longitudinal groove 16.

The removable tread member comprises a ring 17 formed of rubber and fabric, and having its transversely curved tread portion covered with a layer of live rubber 18. This tread member is transversely curved to conform to the corresponding curve of the tire shoe 10, and fits within the channel 11 thereof, with the reduced side portions 19 fitting into the grooves formed between the bottom of the channel 11 and the inner walls of the ribs 15. Formed centrally in the inner face of the tread member, and extending the entire length thereof, is a groove or channel, dove-tail in outline, to receive the dove-tail rib 12. On the sides of the tread member, outwardly of the portions 19, there are formed the rounded projecting ribs or flanges 20 which are received in the grooves 16 of the ribs 15.

The outer face of the shoe 10, as well as the outer faces of the walls of the channel 11, the rib 12, and the ribs 15, are covered with live rubber 21.

In each side portion of the shoe 10 there is embedded an elongated triangular reinforcing ring 22, which serves to brace the ribs 15, and the adjacent walls of the channel 11, while at the same time so strengthening the shoe as to reduce the danger of a blow-out to a minimum.

What is claimed is:

A pneumatic tire comprising a shoe having a circumferentially extending central channel in the periphery thereof with the side walls undercut to form inwardly directed oblique marginal ribs, the end faces of the ribs being longitudinally grooved, a central circumferentially extending dove-tail rib formed on the center of the bottom wall of the said channel and having a reinforcing ring embedded therein, the side portions of the shoe having reinforcing rings which extend into the first-named ribs, and a removable tread member having a portion thereof fitting into the said channel with circumferential side ribs seating within the undercut sides of the channel and in the grooves of the first ribs, respectively, said tread member having a central longitudinal dove-tail groove receiving the central rib of the channel, and friction coverings on the contacting parts of the shoe and tread member.

In testimony whereof, we affix our signatures, in the presence of two witnesses.

GEORGE MICHAELSEN.
JULIUS J. ROTH, Sr.

Witnesses:
MINNIE FREDRICK,
EDWIN H. COREY.